INVENTOR
HERMAN S. PREISER

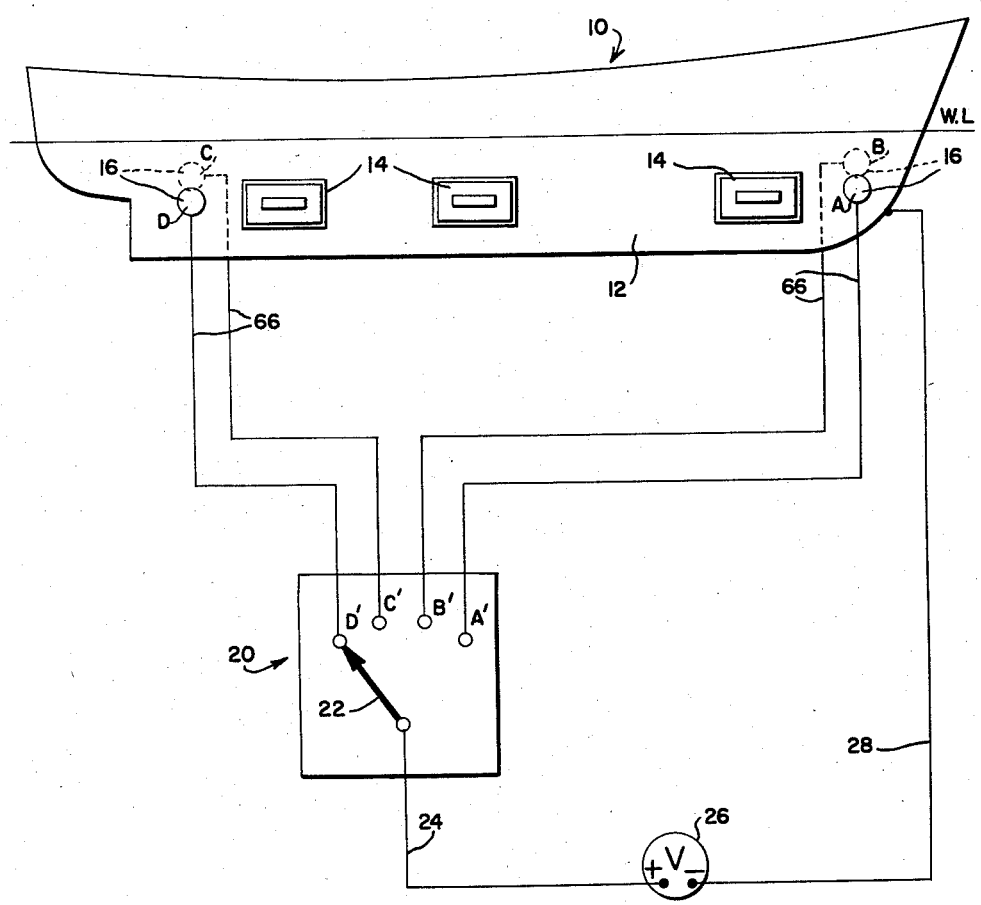

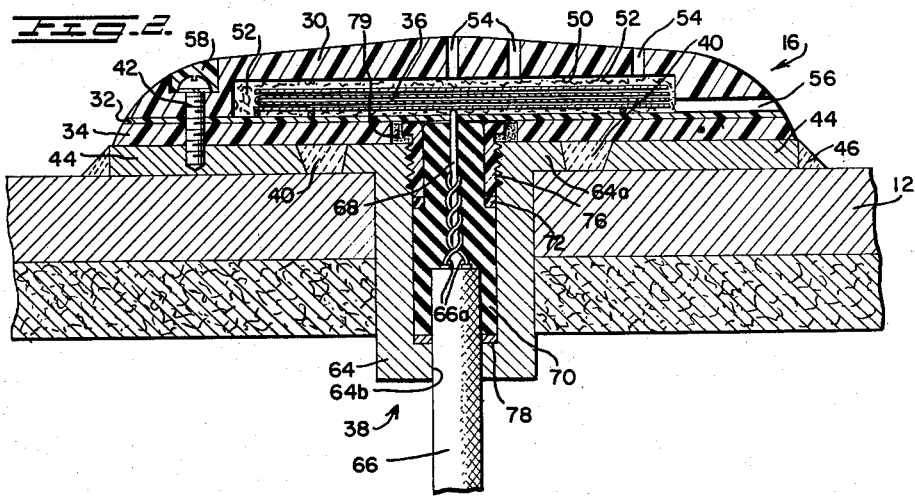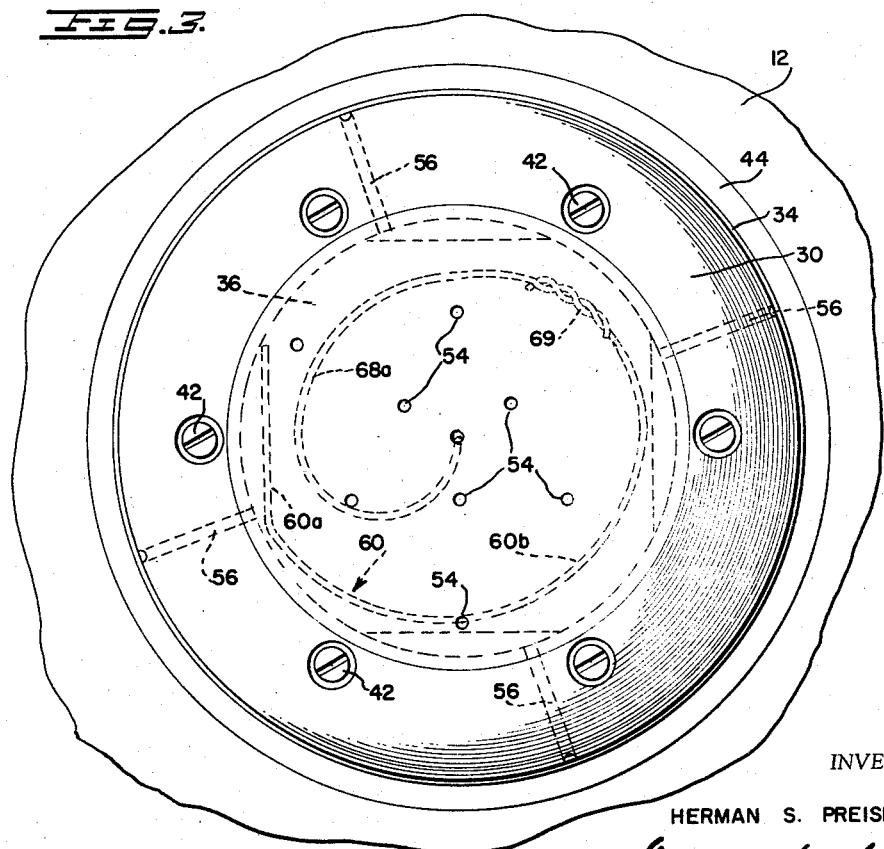

BY *George Sipkin*
*P. L. Zangwill*

ATTORNEYS

2,910,420

Patented Oct. 27, 1959

2,910,420

CATHODIC PROTECTION SYSTEM AND ELECTRODE HOLDER

Herman S. Preiser, North Springfield, Va.

Application July 31, 1957, Serial No. 675,502

7 Claims. (Cl. 204—196)

(Granted under Title 35, U.S. Code (1952), sec. 266)

The invention described herein may be manufactured and used by or for the Government of the United States of America for governmental purposes without the payment of any royalties thereon or therefor.

This invention relates to cathodic protection systems for ships, submarines and the like, and particularly to reference electrodes for such systems.

The purpose of reference electrodes is to provide a means for measuring the potential of a ship's hull fitted with an impressed current, cathodic protection system. The hull potential value is a direct indication of the effectiveness of the cathodic protection system and provides a means for determining the correct amount of protective current that will safely protect a ship from corrosion without damaging the underwater paint coating.

Prior to the instant invention, a conventional method of determining the amount of current necessary for protecting a ship from corrosion was by loosely trailing an electrode of silver-silver chloride or copper-copper sulphate astern to the moving ship. The trailing electrode method possesses a number of inherent disadvantages; the more objectional of which are:

a. Only average potentials of the ship's hull, propeller and operating anodes combined can be measured, which measurement is not a true indication of the potential of the hull in a given area of the ship;

b. Trailing an electrode is cumbersome, often inconvenient and subject to damage and entanglement by the propeller; and c. Trailing electrodes generally are not sufficiently robust to use simple direct reading voltmeters. Null reading potentiometers are required in order that no current is allowed to flow to or from the reference electrode element.

Accordingly, a broad object of the present invention is to provide a reference electrode wherein the above and other inherent disadvantages of prior reference electrodes are eliminated.

Another object of this invention is to provide a shockproof reference electrode for attachment to the hull of a ship.

Another object of this invention is to provide a reference electrode incorporating a large but compact electrode element surface which permits measurements with simple rugged voltmeters.

Another object of this invention is to provide a reference electrode incorporating a stuffing tube that permits easy, watertight electrical connection to suitable meters within the ship.

Another object of this invention is to provide a reference electrode possessing nonpolarizing characteristics under low current drain for use as a sensing element in an automatically controlled cathodic protection system.

Another object of this invention is to provide a reference electrode incorporating a streamlined housing with water passages therein so designed as to keep a relatively stagnant poultice of electrolyte (sea water) in contact with the electrode element.

Another object of this invention is to provide a reference electrode wherein a silver electrode element is electrically insulated from all other metal except the metal whose potential is to be measured.

Another object of this invention is to provide a reference electrode assembly incorporating a disconnect electrode rod, which assembly adapts itself to factory fabrication of the parts under carefully controlled conditions and permits easy removal of the assembly from its stuffing tube for inspection and recalibration.

This invention, together with the above and other objects and advantages is set forth in more technical detail in the following description and accompanying drawing in which like reference characters designate like parts throughout the several views and wherein:

Fig. 1 shows a schematic wiring diagram of a reference electrode hook-up for an impressed current cathodic protection system;

Fig. 2 is a transverse section illustrating a first embodiment of a reference electrode assembly in accordance with this invention;

Fig. 3 is a top plan view of the reference electrode assembly shown in Fig. 2;

Figure 4:
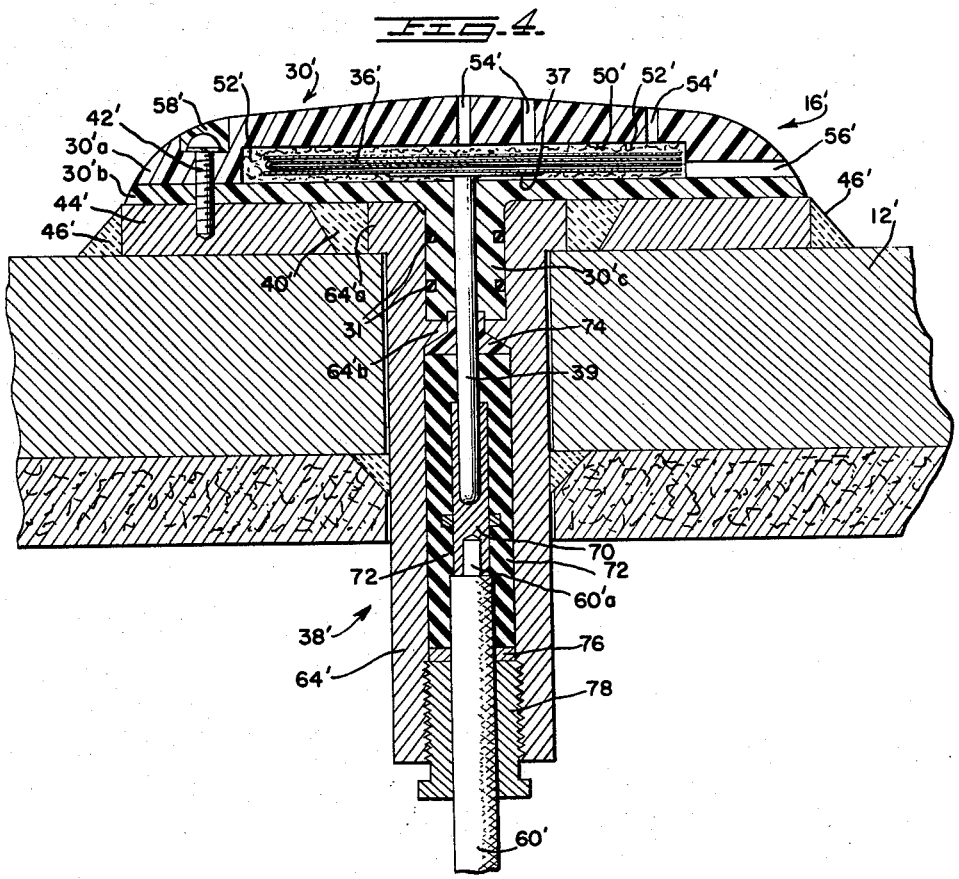
Fig. 4 is a transverse section similar to Fig. 2, illustrating a second embodiment of a reference electrode assembly in accordance with this invention.

Referring now to the drawings, first to Fig. 1, which illustrates an impressed current cathodic protection system applied to the hull 12 of a surface ship 10. The system includes a plurality of rectifier energized anodes 14, each connected by a conductor to an anode balancing control (not shown), which purpose is for measuring current output of each anode and for balancing differences in line resistance. For a complete illustration and detailed description of the anode hook-up, reference may be had to the copending patent application of Herman S. Preiser et al., Serial No. 631,377, filed December 26, 1956, for Energized Anode Holder Assembly.

Referring still to Fig. 1, in accordance with this invention, four reference electrodes 16, to be referred to in detail hereinafter, are mounted on predetermined areas or stations A, B, C and D on the hull 12 of the ship. Generally, the reference electrodes are located as far away as practical from the anodes of the cathodic protection system. In the illustrated hook-up, cable leads 66, to be referred to in detail hereinafter, connect each of the several electrodes to terminals A', B', C' and D', respectively, of a selector switch 20. Each of the cable leads is brought into the hull through a stuffing tube, to be referred to in detail hereinafter. A contact arm 22 of the selector switch is connected by a cable 24 to the positive side of a suitable voltmeter 26, which voltmeter in the instant hook-up is a 20,000 ohm/volt meter. The negative side of the voltmeter is grounded to the hull by a cable 28, thus completing the circuit.

In operation, by switching any one of the reference electrodes into the circuit, an electrochemical cell is set up between the electrode and the hull of the ship. The voltage measured on the meter 26 is the algebraic difference between the half-cell potential of the silver-silver chloride of the sensing element of the reference electrode and the sea water, and the half-cell potential of the hull steel and the sea water; the sensing element or electrode proper being exposed to the sea water electrolyte, as described hereinafter. Now, when current from an anode, such as 14, in the cathodic protection system is impressed on the hull, the hull polarizes or changes its half-cell potental. The silver-silver chloride reference electrode, since it is not connected into the hull circuit except through a very high resistance meter, 26, does not receive any appreciable current from the anode, and, therefore, does not change its half-cell value. Therefore, any change in the reading of the meter 26 of the reference electrode circuit can be attributed to the change of potential of the hull. When the hull is polarized to a potential of −0.80 volts, referred to the silver-silver chloride electrode, it is considered protected from electrochemical corrosion. As pointed out in the above patent application of Herman S. Preiser et al., Serial No. 631,377, the current from the anodes to the hull may be regulated manually or automatically to bring the potential of the hull to the desired value.

As described in detail hereinafter, the construction of each of the reference electrodes is such that its half-cell value is stable and constant and, therefore, it is used as an arbitrary reference standard for measuring the potential difference between it and another metal, the hull steel, in a sea water electrolyte. Since the reference electrode value does not change, it can be assigned a zero value abritrarily and therefore any reading on the meter 26 will actually measure the half-cell value of the metal underconsideration; that is the selected area of the steel hull 12.

Referring now to Figs. 2 and 3 of the drawings, in this first specific embodiment of the invention the reference electrode assembly 16 comprises a holder 30, an insulating disk 32, an insulating spacer 34, a reference electrode or sensing element 36 and a stuffing tube 38. The stuffing tube is welded, as by a ring weld 40, to the hull of the ship, and the holder is attached by machine screws 42 to a steel sole plate 44, which sole plate is welded to the hull by a faired weld 46 and by the ring weld 40.

The holder 30, which is constructed of dielectric, chemically resistant material such as an unplasticized polyvinyl chloride, is formed with a recess or cavity 50 therein for reception of the electrode element 36, which element is cushioned within the cavity by fiber glass matting 52. A plurality of openings 54 open into the cavity and a pluraility of channels 56 lead therefrom. The openings and channels that lead to and from the cavity in the holder are so designed that the sea water electrolyte surrounding the electrode element is relatively stagnant, and together with the fiber glass matting, the sea water forms an eelctrolyte poultice around the electrode element. The holder is formed with suitably spaced openings for receiving the machine screws 42 and these openings are conuterbored to receive the heads of such screws and, after attachment to the hull, the counterbores around the screw heads are filled with a dielectric, chemically resistant material, such as an epoxy thixotropic putty 58. The insulating disk 32 and insulating spaces 34 are each formed of relatively rigid polyvinyl chloride sheet or other suitable dielectric, chemically resistant plastic.

Referring still to Figs. 2 and 3, the electrode element 36 is formed of a length of silver wire gauze folded back and forth upon itself in accordion-like fashion with the corners trimmed to form a member that is substantially circular in plan. One end of a silver wire 60, the straight length 60a (Fig. 3), is fused to one edge of the bottom fold of the electrode element leaving a loose length 60b of such wire free for attachment through a second silver wire to a cable 66, as described hereinafter. After the gauze and lead wire are so assembled, the assembly is cleaned and dried. Then the element is dipped in molten (slightly above 455° C.) silver chloride A.S.C. and left in the solution long enough for the element to reach the temperature of the salt and become wet. The silver chloride adhering to the element is then reduced to silver cathodically by using a platinum anode in a 3% C.P. sodium chloride solution and a current of 200 milliamps for about one hour. After the electrode element is so prepared it is assembled in the holder, as described hereinafter.

The stuffing tube 38 comprises a steel, cup-shaped member 64 having a circular flange 64a on one end thereof and an opening 64b in the other end. The flange 64a abuts the outer surface of the hull and is permanently welded thereto by the ring weld 40. A two-wire cable 66 is inserted through the opening 64b in the bottom of the stuffing tube. The outer end of cable 66 is stripped, exposing the two copper wires 66a which copper wires are twisted about a length of silver wire 68, as shown in Fig. 2, and permanently attached in good electrical contact therewith by silver solder, leaving a free length 68a (Fig. 3) of the silver wire 68 for attachment to the length of silver wire 60b, as described hereinafter. After the parallel copper wires 66a of cable 66 have been secured to the inner end of the silver wire 68, the juncture is sealed in a molded rubber packing 70. Packing 70 is cylindrical in shape to conform to the bore of cup-shaped member 64, and the packing is formed with a reduced diameter portion for reception of a plastic packing ring 72 and a glass-reinforced polyester resin gland nut 76. A bronze packing retainer 78 fits between the bottom of packing 70 and the inside bottom surface of member 64.

In applying the electrode assembly to the hull of the ship, the cup-shaped member 64 of the stuffing tube is inserted through a suitable opening in the hull until the flange 64a abuts the outer surface of the hull. Then the flange is welded to the hull, as by the ring weld 40. Simultaneously with the welding of flange 64a, the sole plate 44 is welded to the hull, first by the ring weld 40, and then by the faired weld 46. The outer end of cable 66 having previously been prepared as described hereinbefore, the cable with the packing retainer 78 and molded packing 70 applied thereto is inserted from outboard through the opening in the bottom of member 64 until the retainer abuts the member 64 and packing 70 abuts the retainer. Then the packing ring 72 and gland nut 76 are applied to the stuffing tube and the gland nut is tightened as necessary to expand the packing 70 into sealing contact with the inner cylindrical wall of member 64. Thus the cable is secured and sealed by the stuffing tube and the outer end 68a of silver wire 68 is free for attachment to the silver wire 60b (Fig. 3) of the electrode. The inner end of cable 66 is attached in suitable manner (not shown) to its respective terminal in selector switch 20 (Fig. 1).

The insulating spacer 34 is then located on the hull and the space between the circular opening in the center of the spacer and the gland nut is filled with a dielectric, chemically resistant putty 79, such as a silicone rubber mastic. Then the insulating disk 32 with the free end of wire 68 projecting through a central opening therein is located on the spacer 34. The free ends of silver wires 60b and 68a are now twisted together, as shown at 69 in Fig. 3, and this juncture is heated to a red heat and struck with a hammer thereby forming a good electrical connection. The folded electrode 36 sandwiched in the fiber glass matting is now placed in the cavity 50 of holder 30, with the silver wire 60 on the bottom side of the electrode element and slack wires 60b and 68a coiled beneath the bottom fold of element 36 leaving slack in the wire for future replacement. The holder with the packed electrode element now contained in the cavity 50 is secured to the sole plate by the machine screws 42, after which the counterbores are filled with the epoxy thixotropic putty 58, the outer surface of which putty is streamlined to the contour of the holder.

Thus there is provided a streamlined, shockproof housing for attachment to the hull of a ship or the like, and which housing contains an electrode element made up of a large area of silver gauze with a relatively large amount of silver chloride fused and chemically reduced on the silver and constituting a robust cell capable of drawing 1/10 of a milliampere of current continuously without appreciably affecting the accuracy of the silver measuring element. This construction permits the use of a 10,000 ohm/volt or higher resistant voltmeter for making the hull potential readings and also allows a sufficiently strong voltage signal to be amplified in automatic control cathodic protection systems. The water passages in the housing or holder permit free flooding of the electrode element but at the same time keeps a relatively stagnant poultice of electrolyte (sea water) in contact with the electrode element. The stagnant sea water surrounding the silver electrode element becomes saturated with silver ions and therefore produces stable readings because of the achievement of electrochemical equilibrium.

Figure 5:
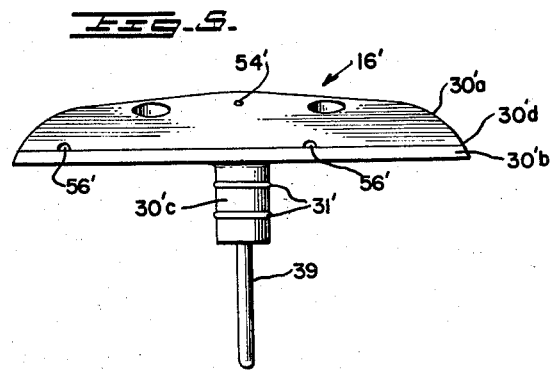
Fig. 5 is an elevational view, on a reduced scale, of the unitary reference electrode assembly shown in Fig. 4.

Referring now to Figs. 4 and 5 of the drawings, which illustrates a second embodiment of the invention, and wherein parts similar to those of the Figs. 2 and 3 embodiment are given like reference characters, primed. In the Figs. 4 and 5 embodiment the reference electrode assembly 16' comprises a holder 30', a reference electrode or sensing element 36' and a stuffing tube 38'. The stuffing tube is welded by the ring weld 40' to the hull 12' of the ship and the holder 30' is attached by machine screws 42' to the sole plate 44', which sole plate is welded to the hull by the faired weld 46' and by the ring weld 40'.

The holder 30' of the Figs. 4 and 5 embodiment is molded of dielectric, chemically resistant plastic, such as rigid unplasticized polyvinyl chloride, and it is made up of two sections 30'a and 30'b. Section 30'a is formed with a cavity 50' for reception of the electrode element 36', which element is cushioned in the cavity by fiber glass matting 52'. A plurality of openings 54' open into the cavity and a plurality of channels 56' lead therefrom. As in the Figs. 2 and 3 embodiment, the openings 54' and channels 56' are so designed that the sea water electrolyte surrounding the electrode element is relatively stagnant. Section 30'b of the holder is formed with an integral shank portion 30'c that fits into the stuffing tube and is sealed therein by a pair of O-rings 31'. During assembly, as described hereinafter, sections 30'a and 30'b of the holder are cemented together at their abutting surfaces 30'd.

The electrode element 36' of the Figs. 4 and 5 embodiment is formed of folded silver wire gauze and the silver gauze is treated with silver chloride and electrolyzed as described hereinbefore with reference to the electrode element 36. However, in the Figs. 4 and 5 embodiment, the electrode element 36' includes a silver backing piece 37 and a silver prong or rod 39. The prong is permanently attached to the backing piece by swaging under red heat and the backing piece is likewise attached to the bottom fold of element 36' by swaging under red heat.

The stuffing tube 38' of the Figs. 4 and 5 embodiment of the instant invention is generally similar to the stuffing tube shown in Figs. 8 and 9 of copending patent application of Herman S. Preiser et al., Serial No. 675,503, filed July 31, 1957, and currently identifed as Navy Case No. 23,911. The stuffing tube 38' comprises steel tubular member 64' having a circular outer flange 64'a and an inner flange 64'b. Flange 64'a abuts the outer surface of the hull and is welded thereto by the ring weld 40'. The inner flange 64'b separates the tubular member into an inner and an outer bore, with the inner bore receiving a cable connector and a packing to be referred to hereinafter, and the outer bore receiving the shank 30'c of the electrode holder.

A single wire cable 60', having a stripped end 60'a with a connector 70 permanently attached thereto and a rubber packing 72 molded about the cable end and the connector, is inserted into the inner bore of the stuffing tube. The connector 70, which is formed of silver plated phosphor-bronze or constructed entirely of silver, is formed with oppositely directed bores therein with the inner bore receiving the stripped end of the cable and the outer bore detachably receiving the electrode rod 39. As shown, the outer bore of the connector is much longer than the inner bore and this portion of the connector is provided with longitudinal slots, not shown, which provide a resilient fit with the inner end of the electrode rod. A packing cone 74, made of Teflon or similar dielectric, chemically resistant material, fits within the inner bore of the stuffing tube, surrounds the electrode rod and seals the opening in flange 64'b. A brass gland ring 76 surrounds the cable and fits between the inner end of packing member 70 and the outer end of a gland nut 78, which gland nut is screw-threaded into the inner end of the stuffing tube. For a detailed description of the manner of preparing the cable, connector and molded rubber packing, and of inserting and sealing this subassembly within the stuffing tube reference may be had to the above patent application of Herman S. Preiser et al., Serial No. 675,503.

As pointed out hereinbefore, the disconnect type of reference electrode incorporated in the Figs. 4 and 5 embodiment of the invention permits factory fabrication of the parts under carefully controlled conditions and the assembly (Fig. 5) is readily removed as a unit from the stuffing tube for inspection and/or recalibration. That is, in fabricating this reference electrode, the holder sections 30'a and 30'b are molded separately. The electrode element 36', with the backing plate 37 and rod 39 attached thereto, is treated with silver chloride. The treated electrode element subassembly is properly positioned in a suitable mold and section 30'b of the holder is formed in a manner such that the shank portion 30'c is molded integrally around the electrode rod 39, leaving the folded electrode element free, which element is electrolized, as described hereinbefore. The electrode element is wrapped or sandwiched with the fiber glass cloth or matting 52' and this subassembly is placed in the cavity 50' of holder section 30'a. The complementary surfaces of sections 30'a and 30'b are coated with a suitable adhesive, and the two holder sections are pressed together forming a relatively permanent joint along the line 30'd. Thus, the electrode assembly (Fig. 5) is completely fabricated at the factory and is ready for installation as a unit on the hull of a ship or the like.

Assuming that the stuffing tube with the cable assembly located therein is attached to the hull, all that is necessary to complete the installation is to insert the rod 39 of the electrode assembly into the stuffing tube with the rod resiliently gripped by the connector 70 and the shank portion 30'c of the holder sealed in the stuffing tube by the O-rings 31. Then the machine screws 42' are threaded into the tapped holes in the sole plate and the putty 58' applied to the counterbores around the screw heads. The gland nut 78 of the stuffing tube is then tightened from inside the hull and in so tightening the gland nut, the rubber packing 72 is compressed against the cylindrical wall of the stuffing tube sealing the same. Tightening of the gland nut also causes the slotted end of the connector to more firmly grip the end of the electrode rod.

To remove the electrode assembly from the hull, all that is necessary is to remove the machine screws 42' and loosen gland nut 78, whereupon the electrode assembly may be removed from the stuffing tube. As stated hereinbefore, the electrode assembly (Fig. 5) is fabricated and sealed at the factory and ordinarily there is no need to open such assembly. However, should it become necessary to, for example, inspect the electrode element, access may be had thereto by prying the two sections 30'a and 30'b of the holder, which sections may again be cemented together after the inspection and/or repair is completed.

It is to be noted, in each of the illustrated embodiments of the invention that the reference electrode assembly

What is claimed is:

1. A reference electrode assembly for use with a cathode protection system for a metal structure wherein the metal structure is exposed to an electrolyte and forms the cathode of the system, said assembly comprising an electrode element formed of electrochemically stable material, an inert, dielectric chemically resistant holder for the electrode element, and means for attaching the holder to the metal structure, said holder comprising a relatively flat, disk-like structure having a streamlined exterior surface and interior walls forming a cavity in the interior thereof for receiving the electrode element, a porous, dielectric, chemically inert matting encasing the electrode element within the cavity of the holder and spacing the electrode element from all of the said interior walls forming such cavity said holder being formed with fluid passages therein leading to and from the cavity of the electrolyte to the electrode element, said electrode element, said matting, said interior walls bounding the cavity and the fluid passages leading to and from the cavity being so constructed and arranged as to cause the electrode element to be surrounded on all surfaces thereof by a relatively stagnant bath of electrolyte, and said electrode element having an electrical conductor connected thereto and leading therefrom to the exterior of the holder for connection to an electrical circuit.

2. A reference electrode assembly as set forth in claim 1 wherein the electrode element is formed of a plurality of layers of silver wire gauze folded back and forth one layer upon another forming a compact accordion-like element.

3. A reference electrode assembly as set forth in claim 2 wherein the silver wire gauze of the electrode element includes a coating of electrolized silver chloride, and wherein the relatively stagnant bath of electrolyte is saturated with silver ions.

4. A reference electrode assembly as set forth in claim 1 wherein the electrode element is formed of silver wire gauze having a silver backing plate attached thereto, and wherein the electrical conductor comprises a silver rod having one end thereof attached to the backing plate and the other end thereof extending through the holder for removable attachment to the electrical circuit.

5. In combination, a reference electrode assembly for use with a cathodic protection system for a metal structure, the metal of which structure forms the cathode of the system and which metal has one surface thereof exposed to sea water that forms the electrolyte of the system, means for removably attaching the electrode assembly to the exposed surface of the structure and connecting means for electrically connecting the electrode assembly on the exposed side of the structure to an electrical circuit on an unexposed side of the structure, said reference electrode assembly comprising an electrode element formed of electrochemically stable material, an inert, dielectric chemically resistant holder having a streamlined exterior surface and interior walls forming a cavity therein for receiving the electrode element, said holder being formed with relatively small fluid passages from the exterior to the cavity for restricted flow of sea water to and from the cavity, a porous, dielectric chemically inert matting encasing the electrode element within the cavity and spacing the electrode element from all of the said interior walls forming such cavity and in a manner as to submerge all surfaces of the electrode element in a relatively stagnant bath of electrolyte within the cavity, and said connecting means including a conductor connected to the electrode element, a stuffing tube that penetrates the structure, a connector within the stuffing tube having one end thereof connected to the electric circuit and the other end thereof connected through the conductor to the electrode element and means within the stuffing tube for sealing the electrical connection.

6. The combination as set forth in claim 1 wherein the reference electrode assembly comprises a subassembly including the electrode element, the holder and the conductor constructed as a unit for removable attachment to the exposed side of the metal structure with the electrode conductor adapted for insertion into and removal from the connector within the stuffing tube.

7. A reference electrode assembly for use with a cathodic protection system for the metal hull structures of a ship exposed to sea water electrolyte and which metal forms the cathode of the protection system, said assembly comprising a relatively flat streamlined holder formed of a dielectric material, chemically resistant to attack by seawater and cathodic reaction products formed on said hull from said protection system, said holder having spaced interior walls thereof forming a cavity for the reception of a reference electrode, said holder being formed with a plurality of relatively small passages for restricted flow of sea water electrolyte to and from the cavity, means for attaching the holder to the exterior surface of the hull below the normal water line thereof, a silver-silver chloride electrode element located within the cavity of the holder and having the same general configuration as that of the cavity of the holder, said electrode being formed of fine silver wire gauze having a coating of electrolyzed silver chloride on all surfaces thereof and constructed of a plurality of layers of such gauze folded back and forth one layer upon another in a compact accordion-like structure having a relatively large surface area compared to the area of the cavity, a matting of porous, dielectric chemically inert material encasing the folded electrode element within the cavity and spacing such element from the said interior walls forming such cavity thereby forming a poultice of relatively stagnant sea water electrolyte about said electrode, and an electrical conductor having one end thereof connected to the electrode element and an opposite end thereof adapted for connection to an electrical circuit.

References Cited in the file of this patent

UNITED STATES PATENTS

| | | |
|---|---|---|
| 2,273,897 | Scott | Feb. 24, 1942 |
| 2,525,665 | Glesner | Oct. 10, 1950 |
| 2,615,839 | Willier | Oct. 28, 1952 |
| 2,672,441 | White | Mar. 16, 1954 |
| 2,721,172 | Higgins et al. | Oct. 18, 1955 |
| 2,733,201 | Thompson | Jan. 31, 1956 |
| 2,776,940 | Oliver | Jan. 8, 1957 |
| 2,776,941 | Wagner | Jan. 8, 1957 |